United States Patent [19]

Lamborn

[11] 4,208,738

[45] Jun. 17, 1980

[54] DEPLOYABLE SONAR ARRAY WITH INTERCONNECTED TRANSDUCERS OPERATED IN THE BENDING MODE

[75] Inventor: Omer E. Lamborn, Canoga Park, Calif.

[73] Assignee: The Bendix Corporation, North Hollywood, Calif.

[21] Appl. No.: 901,548

[22] Filed: May 1, 1978

[51] Int. Cl.[2] ............ H04B 13/00

[52] U.S. Cl. ............ 367/173; 9/8 R; 367/153

[58] Field of Search ............ 206/522, 523; 340/2, 340/8 S, 8 R, 9; 9/8 R; 244/138 R

[56] References Cited

U.S. PATENT DOCUMENTS

| | | | |
|---|---|---|---|
| 3,220,600 | 11/1965 | Wojciechowski | 340/2 |
| 3,377,615 | 4/1968 | Lutes | 340/2 |
| 3,531,040 | 9/1970 | Myny | 206/523 X |
| 3,998,408 | 12/1976 | Caldwell, Jr. et al. | 9/8 R |
| 4,004,309 | 1/1977 | Gongwer | 340/2 |
| 4,075,600 | 2/1978 | Sims et al. | 340/9 |
| 4,093,935 | 6/1978 | Ouellette | 340/8 S |

*Primary Examiner*—Harold J. Tudor
*Attorney, Agent, or Firm*—Robert C. Smith; William F. Thornton

[57] ABSTRACT

A sonar array consists of a significant number of interconnected disk-shaped transducer projectors operating in the bending mode and packaged in a cylindrical housing including a first or lower section including an electronics and battery package for powering the transducer projectors; a main housing containing the stacked, interconnected transducer elements and having padding of foam material for protecting the transducer elements during deployment and handling; and a rear case section which contains a parachute to control rate and attitude of descent from the launching aircraft, a float or buoy in association with the parachute for providing flotation during operation, and a coiled length of nylon rope for suspending the deployed array at the desired distance below the surface. A retaining line or spring clips are used to hold the transducer elements in the main case section during descent in the water following separation of the rear case section and uncoiling of the nylon rope. When the housing reaches the end of the nylon rope, the resulting force acts to pull the transducer elements out of the main case section, breaking the retaining line and/or overcoming the force of the spring clips until the entire array is suspended in the ocean above the housing. A suitable time-responsive means operates to deflate the float or buoy when the array has completed its task.

6 Claims, 10 Drawing Figures

DEPLOYABLE SONAR ARRAY WITH INTERCONNECTED TRANSDUCERS OPERATED IN THE BENDING MODE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Among the several types of sonar systems used to detect underwater objects such as submarines, there is one type in which passive hydrophones are deployed in large numbers in a given area and some means is required to insonify the adjacent volume of water so that echoes or reflections from such underwater objects are received at the sonobuoys. The transmitting means, of course, needs only to be of the proper frequency pattern and signal strength to insonify the water in the general volume of interest. In the past such sources have been in the form of large stationary magnetostriction-type radiators, hydromechanical drive mechanisms, etc.

There is a need for an array which can accomplish the desired insonification for a limited period of time, which is relatively small and light, inexpensive, rugged enough to be launched into the ocean from an aircraft and which, when its mission is completed, will sink itself such that it does not remain as a long term underwater obstacle which could interfere with fishing equipment, other subsequently deployed sonars or instrumentation, or submarines.

DESCRIPTION OF THE PREFERRED EMBODIMENT

Figure 1:
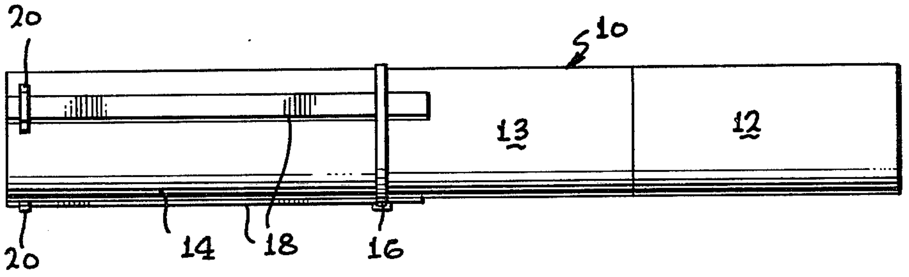

FIG. 1 is a plan view of a transducer assembly which may be used in connection with my invention. Numeral 10 designates a transducer housing assembly having an electronics and battery package 12, a main case section 13, and a removable rear case section 14 which is clamped to case section 13 by means of a ring clamp 16. Clamp 16 includes a pressure-responsive release operating to separate case section 14 from case section 13. Fastened to main case section 13 are a plurality of fin members 18 secured tightly against case section 14 by means of brackets 20. Rear case section 14 contains a substantial length of coiled line such as 1000 feet of nylon cord attached at one end to an inflatable buoy and a parachute shroud and at the opposite end to one of a series of interconnected transducer elements.

Figure 2:
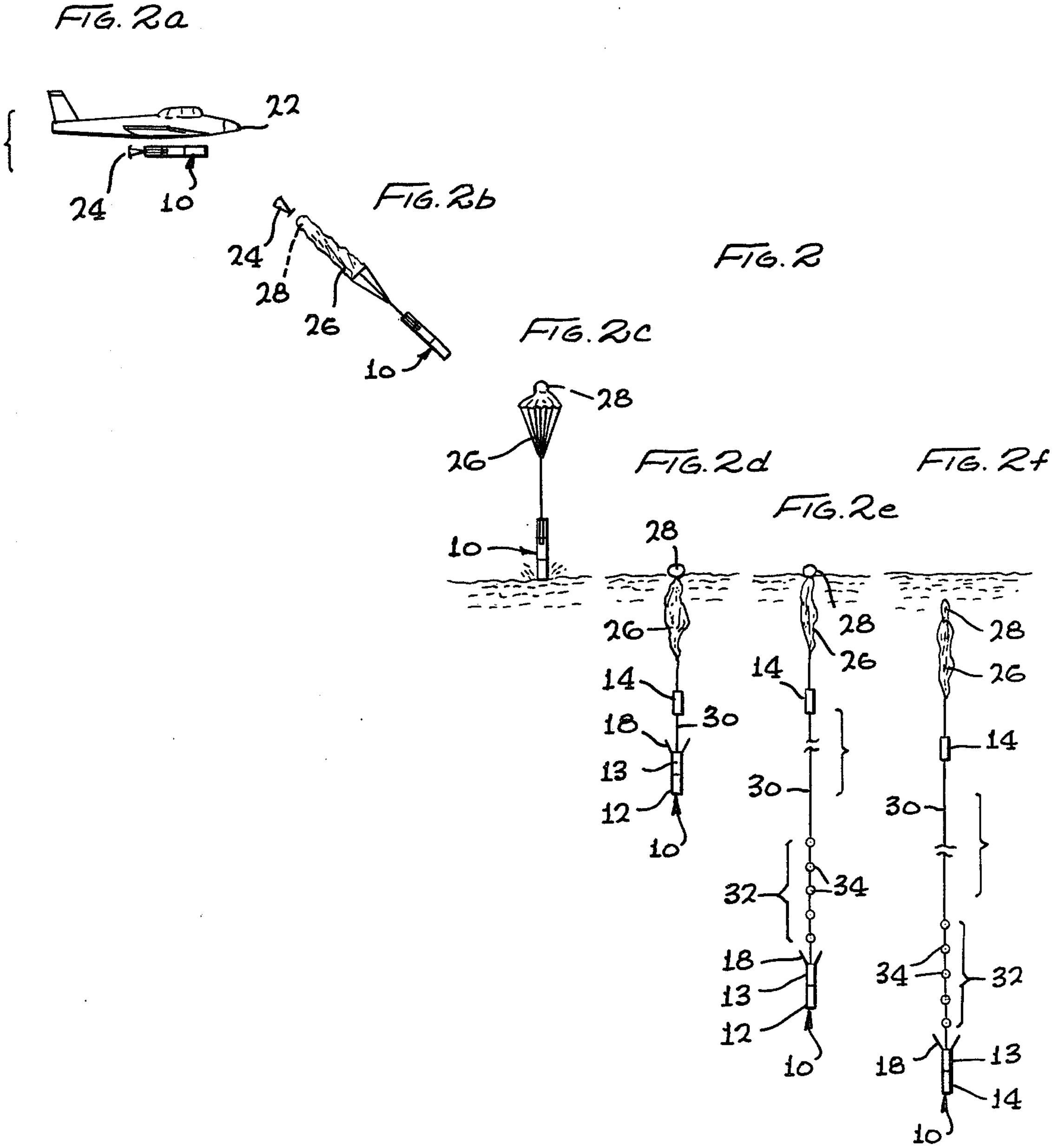

Referring now to FIG. 2, it will be observed that FIG. 2(*a*) depicts an airplane 22 which has just launched transducer housing assembly 10. A cover member 24 is shown separating from the array. In FIG. 2(*b*) the cover has separated, and a parachute 26 has pulled out of the housing and is beginning to open. In FIG. 2(*c*) the housing 10 has impacted the water, and the parachute 26 is shown fully open and with a float member 28 shown associated with the parachute. FIG. 2(*d*) depicts the parachute 26 as collapsed, the float or buoy 28 floating on the surface, rear case section 14 has separated from main case section 13, and the electronics and battery section 12 releasing fin members 18 which spring outwardly as shown. Housing sections 12 and 13, being heavy, continue to sink, thereby beginning to uncoil the nylon rope 30. This nylon rope is fastened to a bulkhead and carefully coiled in rear case section 14 in a "spin-out" chamber such that it releases or uncoils smoothly under the force of the falling transducer assembly without tangling. As the housing sinks, fin members 18 cause the housing to spin, thus providing stability on descent. While rope 30 is preferably of virgin nylon, other materials may be used provided adequate strength is provided, and the rope has preferably a substantial ability to stretch, as does virgin (not prestressed) nylon. The combination of the fins to stabilize and control the sinking rate of housing sections 12 and 13 and the elastic property of the nylon rope allow the float to be of small size for efficient packaging and reduced effects due to wind.

FIG. 2(*e*) shows the entire assembly in deployed position. The main case section 13 and the electronics and battery section 12 have descended such that they have uncoiled all of the nylon rope 30 from rear case section 14 and, continuing to sink, have caused an array of disk-type transducers 32 to be pulled from the interior of main case section 13.

The system is designed to operate for only a limited period of time, and when its mission is accomplished it is desired that it sink to the bottom to remove it from interference with fishing lines, submarine vehicles, other sonars, etc. The float or buoy 28 is provided with suitable means such as a controlled air leak a timed squib, or a dissolvable plug soluble in sea water which causes it to deflate either quickly after the desired period or slowly such that after the desired period of time the entire assembly sinks. In FIG. 2(*f*) the assembly is shown sinking with the float or buoy 28 deflated.

Figure 3:
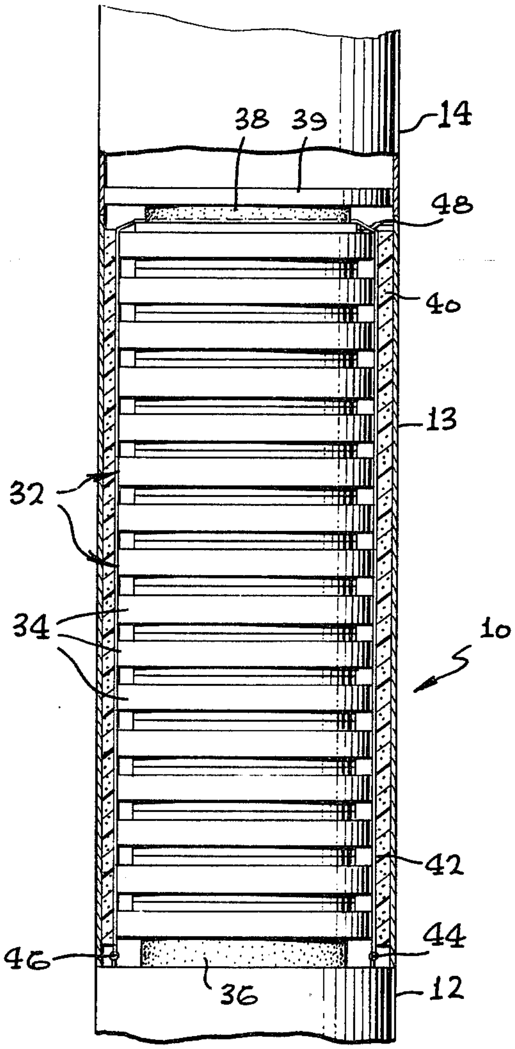

FIG. 3 is a side view, partly in section, of the housing case sections 12 and 13 with the side of section 13 shown in section to expose the manner in which the transducer array 32 is packed prior to deployment. The electronics and battery package 12 is shown with a portion broken away since the details of its contents form no part of the invention. The individual transducers 34 are stacked in the main case section 13 with a plastic foam compression pad 36 on the bottom and a similar compression pad 38 at the top, these compression pads serving to retain the transducers 34 between the housing 12 and a bulkhead 39. While sixteen of transducers 34 are shown, other numbers may be used depending upon factors such as how great a depth of pattern is desired, how much battery power is available, how long it is expected to operate the array, etc., as will be understood by those skilled in the art. Surrounding the stack of transducers 34 is a cylindrical sheath or lining 40 which is of a closed cell type of foam material which supports the transducers during transport and launching but which collapses under the force of water pressure as the assembly descends, to thereby release the transducer elements 34 so that they may be deployed. The assembly is intended to sink during the time the entire length of the nylon rope 30 is being released, and only after reaching the end of this rope is the transducer array 32 to be deployed. To prevent premature release of the transducer array, a light retaining line 42 is fastened to a loop 44 attached to the end wall of the electronics and battery package 12, strung up the sides of the transducer elements 34, over the top of elements 34 and back down to a similar loop 46. Since the upper transducer element 34 is attached to the nylon rope 30, there will be a heavy force or jerk on the rope 30 when it is fully uncoiled from housing 14 due to the continued downward movement of housing members 12 and 13, and this force will begin to pull the elements 34 out of main case section 13, thereby breaking line 42 and also pulling bulkhead 39 and pad 38 out of the way. Alternatively, or supplemental thereto, the transducer elements 34 may be retained during the uncoiling of rope 30 by means of a plurality of small spring-retaining members 48 which must be sufficiently light that they will be bent out of the way when rope 30 is fully uncoiled and begins to pull on the top transducer 34.

Figure 4:
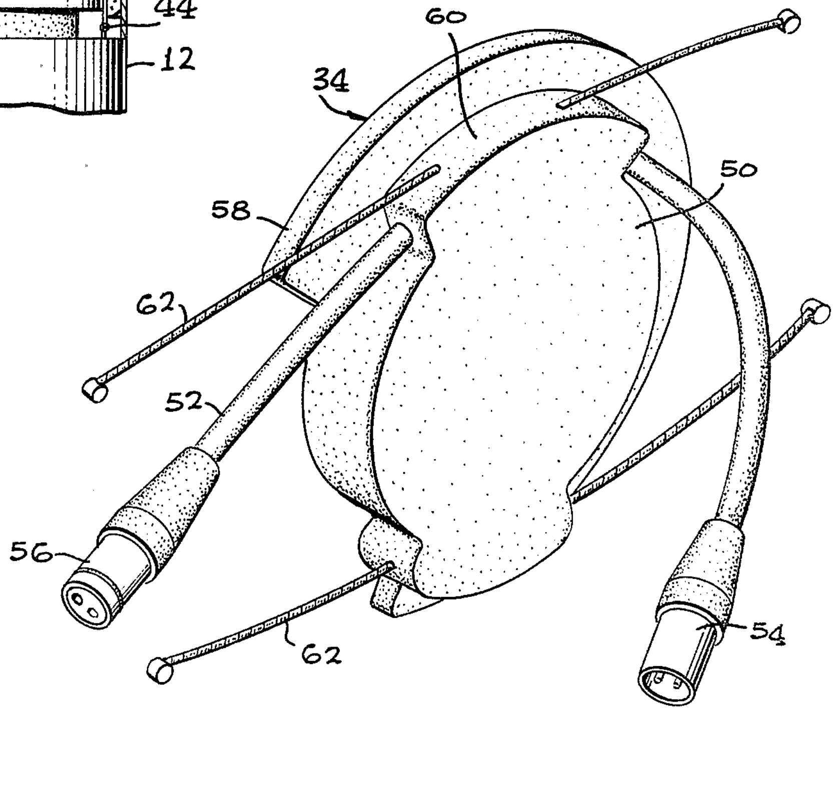

One of the several interconnected transducer elements 34 is shown in FIG. 4. A disk-type piezoelectric transducer 50 operates in the bending mode and is electrically connected to an electrical cable 52 having suitable connectors for connecting together a string of the elements 34. As illustrated, the connector consists of a female housing 54 having internal pins and a mating male connector with pin-receiving sockets 56. Other suitable connectors could be used, and it will be apparent, of course, that the top element 34 will have only one such connector housing. The transducer 50 is carried in a supporting member 58 which makes contact with the foam lining 40. Forming part of transducer element 34 is a molded rubber section 60 which protects the connections between the piezoelectric transducer 50 and the cable 52 and which also retains the ends of one or more wire rope or cable sections 62 which are slightly shorter than the parallel section of cable 50 such that it carries the mechanical load between the deployed transducer elements 34, thereby preventing mechanical loading of the electrical cable 50 and its connectors.

From the foregoing, it will be appreciated that the herein described transducer array meets the requirements of being quite compact such that it is easily portable, comparatively inexpensive, sufficiently rugged to withstand launch from an aircraft, effective to insonify a substantial volume of ocean for the requisite time, and capable of sinking itself when its mission is accomplished so that it doesn't remain a hazard to later ocean activities.

I claim:

1. A sonar array adapted to be launched from a significant height above a body of water comprising an elongated housing of generally cylindrical configuration having a main case section and a separable rear case section, and a source of electrical power in said housing, an array of disk-type sonar transducers operable in the bending mode stacked in said main case section including means electrically interconnecting said transducers and said source of electrical power and cable means mechanically connecting said transducers to each other and to said housing, a shock-absorbing layer positioned between said transducers and the inside surface of said main case section, a parachute device in said rear case section deployed upon launch and tethering means connecting said parachute device to said array and contained in a spin-out package in said rear case section, a float for supporting said array in the water for a period of time and including means for collapsing said float at the end of said time, and retaining means holding said transducers stacked in said main case section until said cable is fully extended, after which the force of descent of said main case section overcomes said retaining means and said interconnected transducers are deployed from the top of said main case section as it descends.

2. A sonar array as set forth in claim 1 wherein said retaining means includes breakable tension lines.

3. A sonar array as set forth in claim 1 wherein said retaining means includes metal spring clips.

4. A sonar array as set forth in claim 1 wherein said tethering means is a rope of virgin nylon connected between the shroud of said parachute and the upper transducer of said array.

5. A sonar array as set forth in claim 1 wherein said shock-absorbing layer is a closed cell type of foam material and said material collapses when exposed to the ambient pressure at operating depth to aid in release of said transducers.

6. A sonar array as set forth in claim 5 wherein said shock-absorbing layer includes compression pads for placing an end loading on said transducers.

* * * * *